US012670195B2

(12) United States Patent
Niu et al.

(10) Patent No.: US 12,670,195 B2
(45) Date of Patent: Jun. 30, 2026

(54) CODE RETRIEVAL METHOD AND APPARATUS BASED ON LARGE LANGUAGE MODEL

(71) Applicant: BEIJING BAIDU NETCOM SCIENCE TECHNOLOGY CO., LTD., Beijing (CN)

(72) Inventors: Wanpeng Niu, Beijing (CN); Junwei Xing, Beijing (CN); Sai Gao, Beijing (CN); Haonan Fang, Beijing (CN); Hui Li, Beijing (CN); Bingfei Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/803,085

(22) Filed: Aug. 13, 2024

(65) Prior Publication Data

US 2024/0403344 A1      Dec. 5, 2024

(30) Foreign Application Priority Data

Jun. 20, 2024    (CN) .......................... 202410800398.0

(51) Int. Cl.
 *G06F 16/334*      (2025.01)
 *G06F 8/41*      (2018.01)
 *G06F 16/31*      (2019.01)

(52) U.S. Cl.
 CPC .......... *G06F 16/3347* (2019.01); *G06F 8/447* (2013.01); *G06F 16/322* (2019.01)

(58) Field of Classification Search
 CPC .......................... G06F 16/3347; G06F 16/322
 USPC ........................................................ 707/741
 See application file for complete search history.

(56) References Cited

U.S. PATENT DOCUMENTS

| | | | | |
|---|---|---|---|---|
| 5,261,100 A * | 11/1993 | Fujinami | ................... | G06F 8/36 |
| | | | | 717/122 |
| 7,210,041 B1 * | 4/2007 | Gryaznov | ............... | G06F 21/56 |
| | | | | 713/188 |
| 9,305,111 B1 * | 4/2016 | Fraenkel | ................. | G06F 40/30 |
| 11,954,429 B2 * | 4/2024 | Clement | ................ | G06N 3/084 |
| 12,272,265 B2 * | 4/2025 | Naufel | .................... | G06F 40/40 |

(Continued)

*Primary Examiner* — Kimberly L Wilson
(74) *Attorney, Agent, or Firm* — Kwan & Olynick LLP

(57) ABSTRACT

There is provided a code retrieval method and apparatus based on a large language model, an electronic device and a readable storage medium, which relates to the field of artificial intelligence technologies, such as large language model technologies, big data technologies, cloud service technologies, or the like. The method for code retrieval based on a large language model includes: acquiring a code retrieval query to obtain a retrieval vector of the code retrieval query; acquiring a first index of a target code library, the first index including a plurality of code blocks and a plurality of code block vectors; acquiring a target code block according to the retrieval vector and the first index; acquiring a second index of the target code library, the second index being a code architecture knowledge graph; acquiring a target code file corresponding to the target code block according to a source code file corresponding to the target code block and the second index; and acquiring a retrieval result according to the target code block and the target code file.

12 Claims, 6 Drawing Sheets

(56) References Cited

U.S. PATENT DOCUMENTS

2023/0409290 A1 *  12/2023  Duggal ............ G06Q 10/06311
2025/0251932 A1 *   8/2025  Hensley ................ G06F 16/334

* cited by examiner

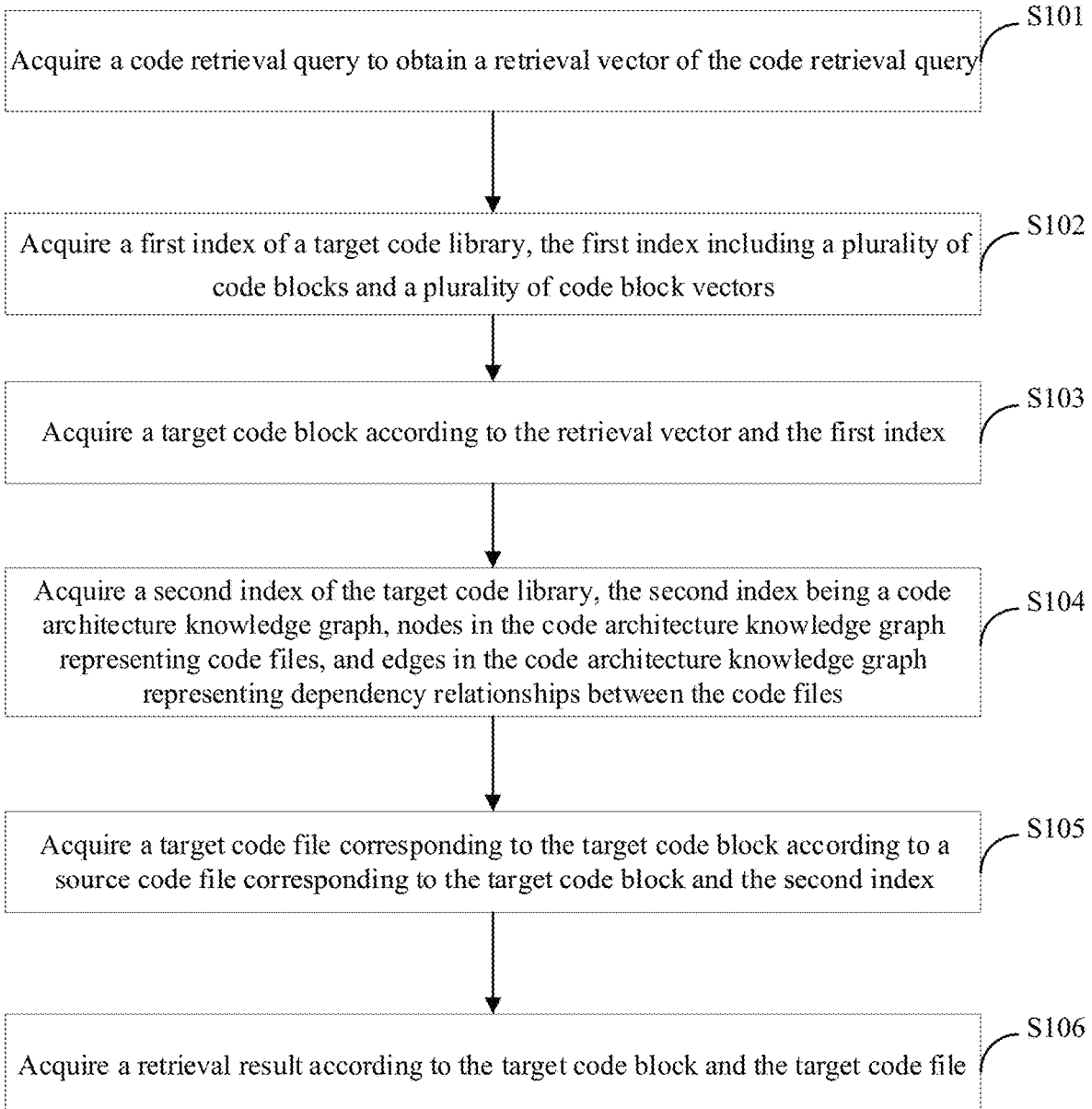

Acquire a code retrieval query to obtain a retrieval vector of the code retrieval query — S101

Acquire a first index of a target code library, the first index including a plurality of code blocks and a plurality of code block vectors — S102

Acquire a target code block according to the retrieval vector and the first index — S103

Acquire a second index of the target code library, the second index being a code architecture knowledge graph, nodes in the code architecture knowledge graph representing code files, and edges in the code architecture knowledge graph representing dependency relationships between the code files — S104

Acquire a target code file corresponding to the target code block according to a source code file corresponding to the target code block and the second index — S105

Acquire a retrieval result according to the target code block and the target code file — S106

Fig.1

Acquire all code files in the target code library — S201

Generate a directory tree according to all the code files and directory information of each code file in the target code library — S202

Input the directory tree into a code architecture extraction model to obtain the output second index — S203

Code architecture knowledge graph

500

Apparatus for code retrieval based on large language model

First acquiring unit                    501

Second acquiring unit                    502

First retrieving unit                    503

Third acquiring unit                    504

Second retrieving unit                    505

Processing unit                    506

Training unit                    507

CODE RETRIEVAL METHOD AND APPARATUS BASED ON LARGE LANGUAGE MODEL

The present application claims the priority of Chinese Patent Application No. 2024108003980, filed on Jun. 20, 2024, with the title of "CODE RETRIEVAL METHOD AND APPARATUS BASED ON LARGE LANGUAGE MODEL". The disclosure of the above application is incorporated herein by reference in its entirety.

FIELD OF THE DISCLOSURE

The present disclosure relates to the field of data processing technologies, and particularly to the field of artificial intelligence technologies, such as large language model technologies, big data technologies, cloud service technologies, or the like, and provides a code retrieval method and apparatus based on a large language model, an electronic device and a readable storage medium.

BACKGROUND OF THE DISCLOSURE

Existing code retrieval is usually performed in a vector library corresponding to code blocks only according to a query input by a user, and then, at least one retrieved code block is used as a code retrieval result, resulting in low accuracy of the code retrieval result.

SUMMARY OF THE DISCLOSURE

According to a first aspect of the present disclosure, there is provided a method for code retrieval based on a large language model, including: acquiring a code retrieval query to obtain a retrieval vector of the code retrieval query; acquiring a first index of a target code library, the first index including a plurality of code blocks and a plurality of code block vectors; acquiring a target code block according to the retrieval vector and the first index; acquiring a second index of the target code library, the second index being a code architecture knowledge graph, nodes in the code architecture knowledge graph representing code files, and edges in the code architecture knowledge graph representing dependency relationships between the code files; acquiring a target code file corresponding to the target code block according to a source code file corresponding to the target code block and the second index; and acquiring a retrieval result according to the target code block and the target code file.

According to a second aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a method for code retrieval based on a large language model, wherein the method for code retrieval based on a large language model includes: acquiring a code retrieval query to obtain a retrieval vector of the code retrieval query; acquiring a first index of a target code library, the first index including a plurality of code blocks and a plurality of code block vectors; acquiring a target code block according to the retrieval vector and the first index; acquiring a second index of the target code library, the second index being a code architecture knowledge graph, nodes in the code architecture knowledge graph representing code files, and edges in the code architecture knowledge graph representing dependency relationships between the code files; acquiring a target code file corresponding to the target code block according to a source code file corresponding to the target code block and the second index; and acquiring a retrieval result according to the target code block and the target code file.

According to a third aspect of the present disclosure, there is provided an on-transitory computer readable storage medium with computer instructions stored thereon, wherein the computer instructions are used for causing a method for code retrieval based on a large language model, wherein the method for code retrieval based on a large language model includes: acquiring a code retrieval query to obtain a retrieval vector of the code retrieval query; acquiring a first index of a target code library, the first index including a plurality of code blocks and a plurality of code block vectors; acquiring a target code block according to the retrieval vector and the first index; acquiring a second index of the target code library, the second index being a code architecture knowledge graph, nodes in the code architecture knowledge graph representing code files, and edges in the code architecture knowledge graph representing dependency relationships between the code files; acquiring a target code file corresponding to the target code block according to a source code file corresponding to the target code block and the second index; and acquiring a retrieval result according to the target code block and the target code file.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings, FIG. 1 is a schematic diagram according to a first embodiment of the present disclosure;

DETAILED DESCRIPTION OF PREFERRED EMBODIMENTS

Figure 2:
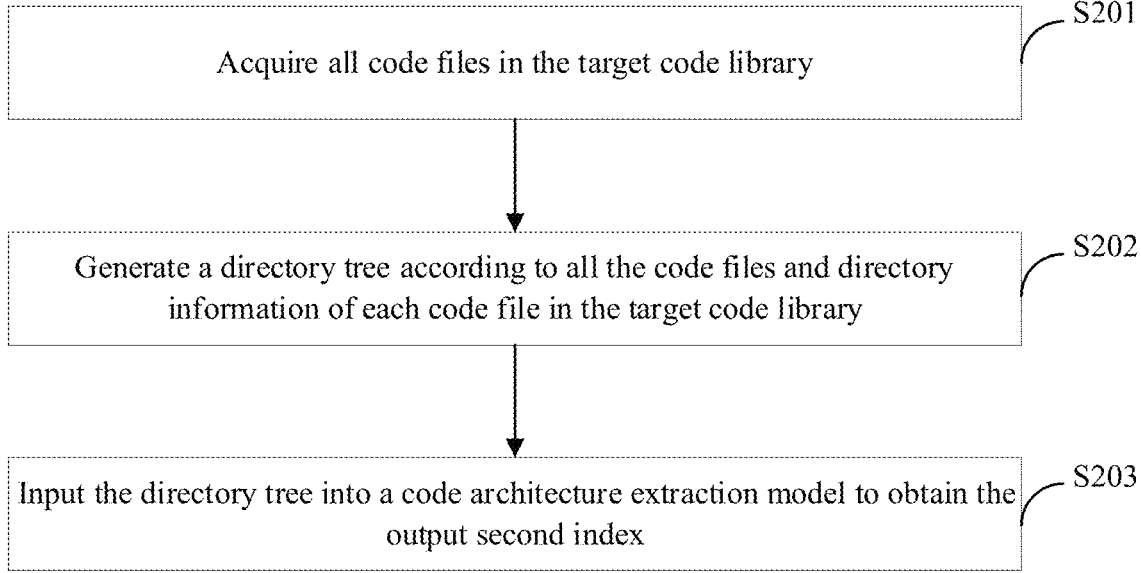
FIG. 2 is a schematic diagram according to a second embodiment of the present disclosure.

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

FIG. 1 is a schematic diagram according to a first embodiment of the present disclosure. As shown in FIG. 1, a method for code retrieval based on a large language model according to the present embodiment may include the following steps:

S101: acquiring a code retrieval query to obtain a retrieval vector of the code retrieval query;

S102: acquiring a first index of a target code library, the first index including a plurality of code blocks and a plurality of code block vectors;

S103: acquiring a target code block according to the retrieval vector and the first index;

S104: acquiring a second index of the target code library, the second index being a code architecture knowledge graph, nodes in the code architecture knowledge graph representing code files, and edges in the code architecture knowledge graph representing dependency relationships between the code files;

S105: acquiring a target code file corresponding to the target code block according to a source code file corresponding to the target code block and the second index; and S106: acquiring a retrieval result according to the target code block and the target code file.

In the method for code retrieval based on a large language model according to the present embodiment, the dependency relationships between the code blocks in the target code library and other code files can be fully considered, and after the target code block corresponding to the code retrieval query is obtained, the code architecture knowledge graph capable of reflecting the whole architecture of the target code library is further used to obtain the target code file corresponding to the target code block, thus avoiding the problem that only a single code block retrieved from the target code library is used as the code retrieval result, and improving code retrieval accuracy and richness of the obtained code retrieval result.

It can be understood that, when the foregoing steps are performed in the present embodiment, the acquiring of the first index, the acquiring of the target code block, the acquiring of the second index, the acquiring of the target code file, or the like, can be completed by calling the large language model.

In the present embodiment, the code retrieval query obtained in the S101 is a query for retrieving a corresponding code from the target code library; in the present embodiment, when the S101 is executed, an initial query input at an input end may be first acquired, and then, the code retrieval query may be further acquired according to the obtained initial query.

For example, if the initial query obtained in the S101 in the present embodiment is "help me sort out the code logic of the payment system", the initial query may be directly used as the code retrieval query in the present embodiment, so as to retrieve a code related to "payment system" in the target code library; if the initial query obtained in the S101 in the present embodiment is "continue to write the code according to the input code, the input code being code A", "code A" obtained from the initial query may be used as the code retrieval query in the present embodiment, so as to retrieve a code related to "code A" in the target code library.

That is, the method for code retrieval according to the present embodiment can be applied to two different scenarios: a "code asking-answering scenario" and a "code continuous writing scenario" (i.e., a code generation scenario); if the method is applied to the "code asking-answering scenario", the finally obtained code retrieval result is used as an answer and returned to the input end in the present embodiment; if the method is applied to the "code continuous writing scenario", the obtained code retrieval result is input into the large language model in the present embodiment, such that a code continuous writing result output by the large language model is obtained and returned to the input end.

In the present embodiment, when the S101 is executed to obtain the retrieval vector of the code retrieval query, the code retrieval query may be subjected to embedding using an existing embedding model or embedding method, and an obtained embedded vector may be used as the retrieval vector corresponding to the code retrieval query.

In addition, in the present embodiment, when the S101 is executed, the code retrieval query may be rewritten first to generate a plurality of rewritten queries corresponding to the code retrieval query, and then, the retrieval vector for each rewritten query may be obtained.

That is, in the present embodiment, the plurality of rewritten queries similar to the code retrieval query may be obtained by rewriting the code retrieval query, thereby improving accuracy of retrieval of the target code block in the first index.

In the present embodiment, after the S101 is executed to obtain the retrieval vector of the code retrieval query, the S102 of acquiring a first index of a target code library is executed; the first index of the present embodiment includes the plurality of code blocks and the plurality of code block vectors, and different code blocks correspond to different code block vectors.

In the present embodiment, the target code library may be a code library specified by the input end, or a code library corresponding to a current code environment in the input end.

In the present embodiment, when the S102 is executed to acquire the first index, the first index obtained in advance according to the target code library may be acquired, or the first index obtained in real time according to the target code library may be acquired.

When the S102 of acquiring a first index of a target code library is executed in the present embodiment, the following implementation may be adopted: acquiring all code files in the target code library; after a syntax tree of each code file is parsed, cutting each code file into a plurality of code blocks according to a syntax rule; performing embedding on the obtained multiple code blocks to obtain the different code block vectors corresponding to the different code blocks; and obtaining the first index according to the plurality of code blocks and the plurality of code block vectors.

In the present embodiment, after the S102 is executed to obtain the first index, the S103 of acquiring a target code block according to the retrieval vector and the first index is executed; in the present embodiment, the number of the target code blocks may be one or more.

When the S103 of acquiring a target code block according to the retrieval vector and the first index is executed in the present embodiment, the following implementation may be adopted: performing similarity calculation on the retrieval vector and the plurality of code block vectors in the first index; and obtaining at least one target code block according to a similarity calculation result; for example, the code blocks corresponding to the code block vectors with top N similarity calculation results can be used as the at least one target code block, N being a positive integer greater than or equal to 1.

In the present embodiment, after the S103 is executed to obtain the target code block, the S104 of acquiring a second index of the target code library is executed; the second index is the code architecture knowledge graph including the plurality of nodes and the edges between the nodes.

In the present embodiment, the nodes in the code architecture knowledge graph represent the code files in the target code library, and the edges between the nodes represent the dependency relationships between the code files in the target code library.

It can be understood that the nodes in the code architecture knowledge graph of the embodiment may represent the code files using file names or directory information of the code files.

That is, in the present embodiment, the second index is constructed in the form of the knowledge graph, such that the second index can effectively describe the code files in the target code library and the dependency relationship between the code files, thereby sufficiently reflecting a code architecture of the target code library, and enabling the target code file to be retrieved based on the second index in the present embodiment.

In the present embodiment, when the S104 is executed to acquire the second index, the second index obtained in advance according to the target code library may be acquired, or the second index obtained in real time according to the target code library may be acquired.

In the present embodiment, when the S104 is executed to obtain the second index, the second index may be manually constructed according to directories to which the different code files in the target code library belong and a relationship between the directories; that is, the nodes and the edges between the nodes in the code architecture knowledge graph are determined manually.

In the present embodiment, after the S104 is executed to obtain the second index, the S105 of acquiring a target code file corresponding to the target code block according to a source code file corresponding to the target code block and the second index is executed; the number of the target code files corresponding to one target code block may be one or more.

It can be understood that, if a plurality of target code blocks are acquired, the target code file corresponding to each target code block is acquired when the S105 is executed in the present embodiment.

In the present embodiment, the source code file corresponding to the target code block is a code file to which the target code block belongs in the target code library; that is, the source code file is segmented to obtain the target code block. For example, if a code file of code block 1 in the target code library is code file 1, in the present embodiment, code file 1 is taken as the source code file corresponding to code block 1 when the S103 is executed.

When the S105 of acquiring a target code file corresponding to the target code block according to a source code file corresponding to the target code block and the second index is executed in the present embodiment, the following implementation may be adopted: determining a source node corresponding to the source code file in the second index according to the source code file corresponding to the target code block, for example, determining a node corresponding to a file name of the source code file as the source node, or determining a node corresponding to a directory of the source code as the source node; selecting a target node having an edge with the source node from the second index; and acquiring the target code file corresponding to the target node from the target code library.

For example, if the current target code block is code block 1, the source code file corresponding to code block 1 is code file 1, the source node of code file 1 in the second index is node 1, the nodes having edges with node 1 in the second index are node 3, node 4 and node 7, the code file corresponding to node 3 is code file 3, the code file corresponding to node 4 is code file 4 and the code file corresponding to node 7 is code file 7, in the present embodiment, when the S103 is executed, code file 3, code file 4 and code file 7 may be obtained from the target code library as the target code files corresponding to code block 1.

That is, in the present embodiment, according to the nodes and the edges between the nodes included in the second index, the at least one target code file corresponding to the target code block is acquired from the target code library based on the source code file corresponding to the target code block; the present embodiment may realize acquisition of the target code file and improve accuracy of the acquired target code file.

In the present embodiment, after the S105 is executed to obtain the target code file corresponding to the target code block, the S106 of acquiring a retrieval result according to the target code block and the target code file is executed, and the retrieval result corresponds to the code retrieval query.

That is, the code retrieval result obtained in the present embodiment includes two parts: the target code block and the target code file corresponding to the target code block, and compared with the prior art that only the target code block is used as the retrieval result, the present embodiment can improve the richness of the obtained retrieval result, and then enhance accuracy when the retrieval result is subsequently used for code asking and answering or code continuous writing.

In the present embodiment, after the retrieval result is obtained in the S104, if the initial query is a query corresponding to code continuous writing, a prompt may be constructed according to the target code block and the target code file corresponding to the target code block, and then, a code generation result output by the large language model is obtained according to the constructed prompt by calling the large language model.

In order to improve accuracy of the constructed prompt, the prompt may also be constructed according to the target code block, the target code file corresponding to the target code block, and the initial query in the present embodiment.

FIG. 2 is a schematic diagram according to a second embodiment of the present disclosure. As shown in FIG. 2, in the present embodiment, the S104 of acquiring a second index of the target code library may include:

S201: acquiring all code files in the target code library;

S202: generating a directory tree according to all the code files and directory information of each code file in the target code library; and S203: inputting the directory tree into a code architecture extraction model to obtain the output second index.

That is, in the present embodiment, the second index may also be obtained using the code architecture extraction model according to the directory tree generated by all the code files in the target code library, and the present embodiment can improve an acquisition efficiency and acquisition accuracy of the second index.

In the present embodiment, when the S203 is executed, the used code architecture extraction model is obtained by pre-training; the code architecture extraction model can output the code architecture knowledge graph corresponding to the target code library according to the input directory tree corresponding to the target code library, and then, the output code architecture knowledge graph is used as the second index.

In the present embodiment, the code architecture extraction model may be obtained by performing training in advance in the following manner: acquiring training data, the acquired training data including a sample directory tree and a label code architecture knowledge graph; inputting the sample directory tree into an initial neural network model to obtain an output prediction code architecture knowledge graph; calculating a loss function value according to the obtained prediction code architecture knowledge graph and the label code architecture knowledge graph; and adjusting parameters of the initial neural network model according to the loss function value to obtain the code architecture extraction model.

Figure 3:
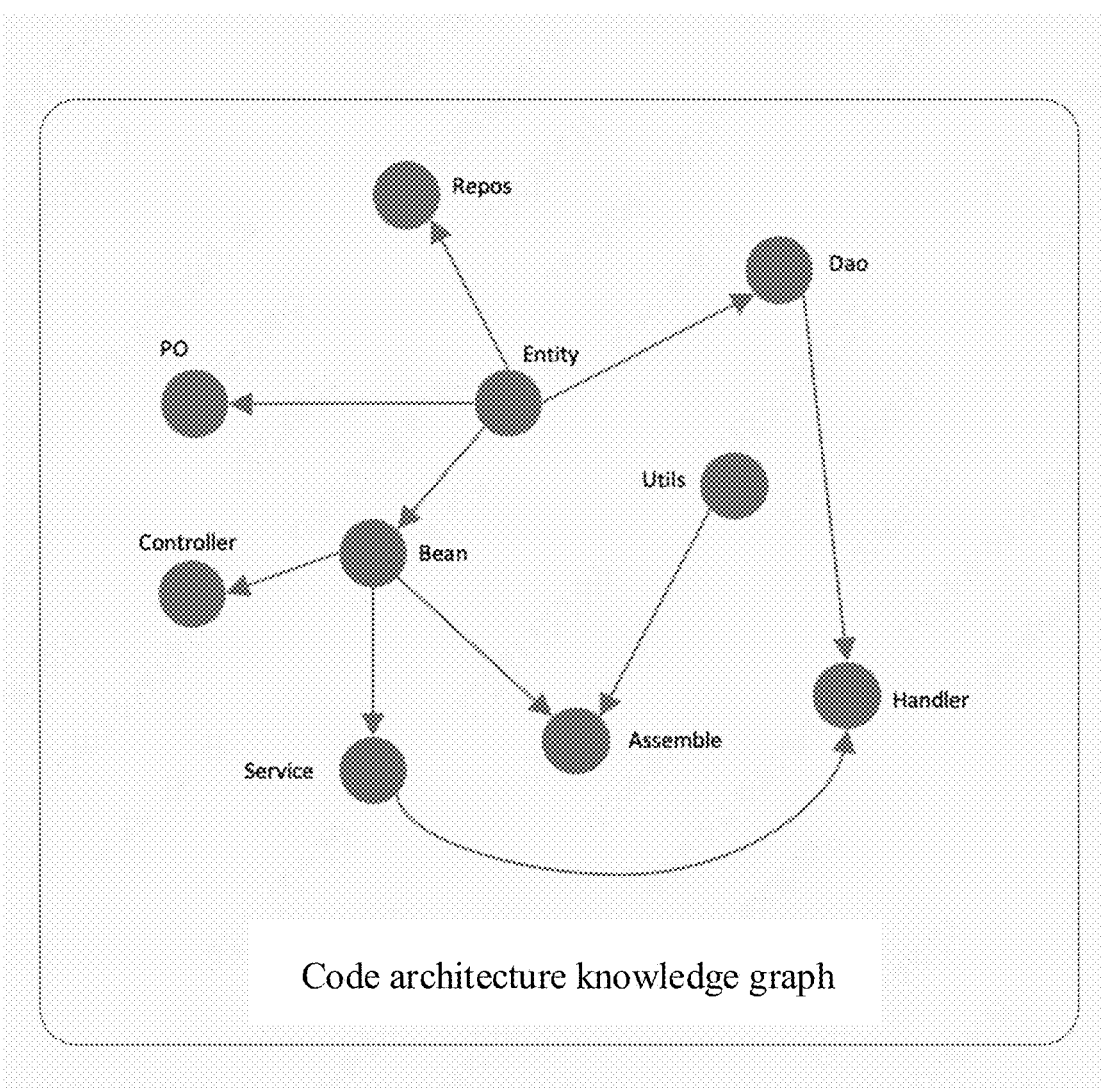
FIG. 3 is a schematic diagram according to a third embodiment of the present disclosure.

FIG. 3 is a schematic diagram according to a third embodiment of the present disclosure. FIG. 3 shows a schematic diagram of the second index in the present embodiment: the nodes in FIG. 3 may be directory nodes; that is, different nodes correspond to different directories in the target code library, and each of different directories correspond to at least one code file; for example, the Entity node in FIG. 3 corresponds to an Entity directory in the code library, and the Service node corresponds to a Service directory in the code library.

Figure 4:
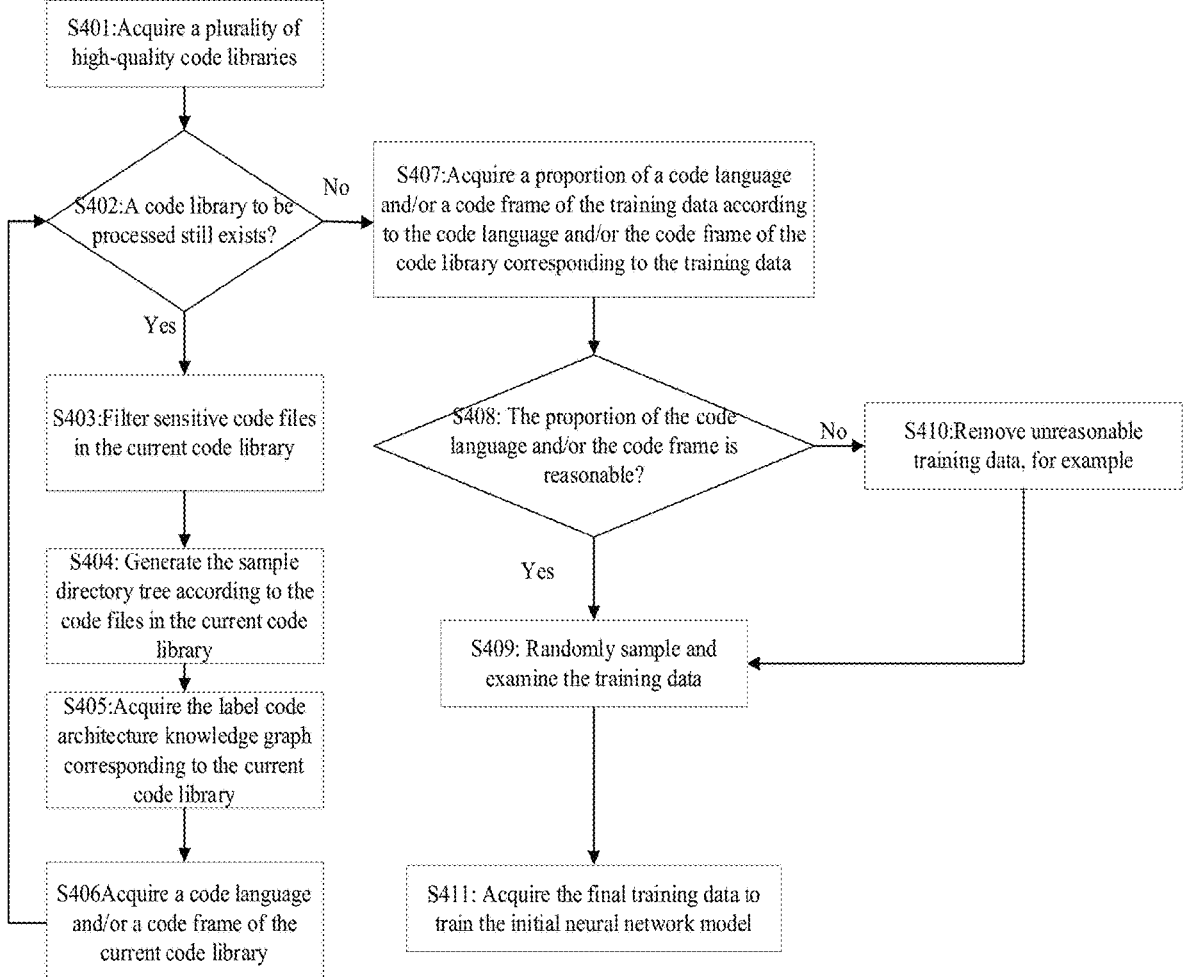
FIG. 4 is a schematic diagram according to a fourth embodiment of the present disclosure.

FIG. 4 is a schematic diagram according to a fourth embodiment of the present disclosure. FIG. 4 shows a flowchart of acquisition of the training data in the present embodiment: S401: acquiring a plurality of high-quality code libraries; S402: detecting whether a code library to be processed still exists, if yes, executing S403, and if no, executing S407; S403: filtering sensitive code files in the current code library; S404: generating the sample directory tree according to the code files in the current code library; S405: acquiring the label code architecture knowledge graph corresponding to the current code library; S406: acquiring a code language and/or a code frame of the current code library; S407: acquiring a proportion of a code language and/or a code frame of the training data according to the code language and/or the code frame of the code library corresponding to the training data; S408: detecting whether the proportion of the code language and/or the code frame is reasonable, if yes, executing S409, and if no, executing S410, for example, the proportion of the training data in a JAVA language being 30%, the proportion of the training data in a Python language being 40%, and the proportion of the training data in other languages being 30%; S409: randomly sampling and examining the training data; S410: removing unreasonable training data, for example, if the current proportion of the training data in the JAVA language is 40%, the corresponding training data being cut to enable the proportion of the training data in the JAVA language to be reduced from 40% to 30%; and S411: acquiring the final training data to train the initial neural network model.

Figure 5:
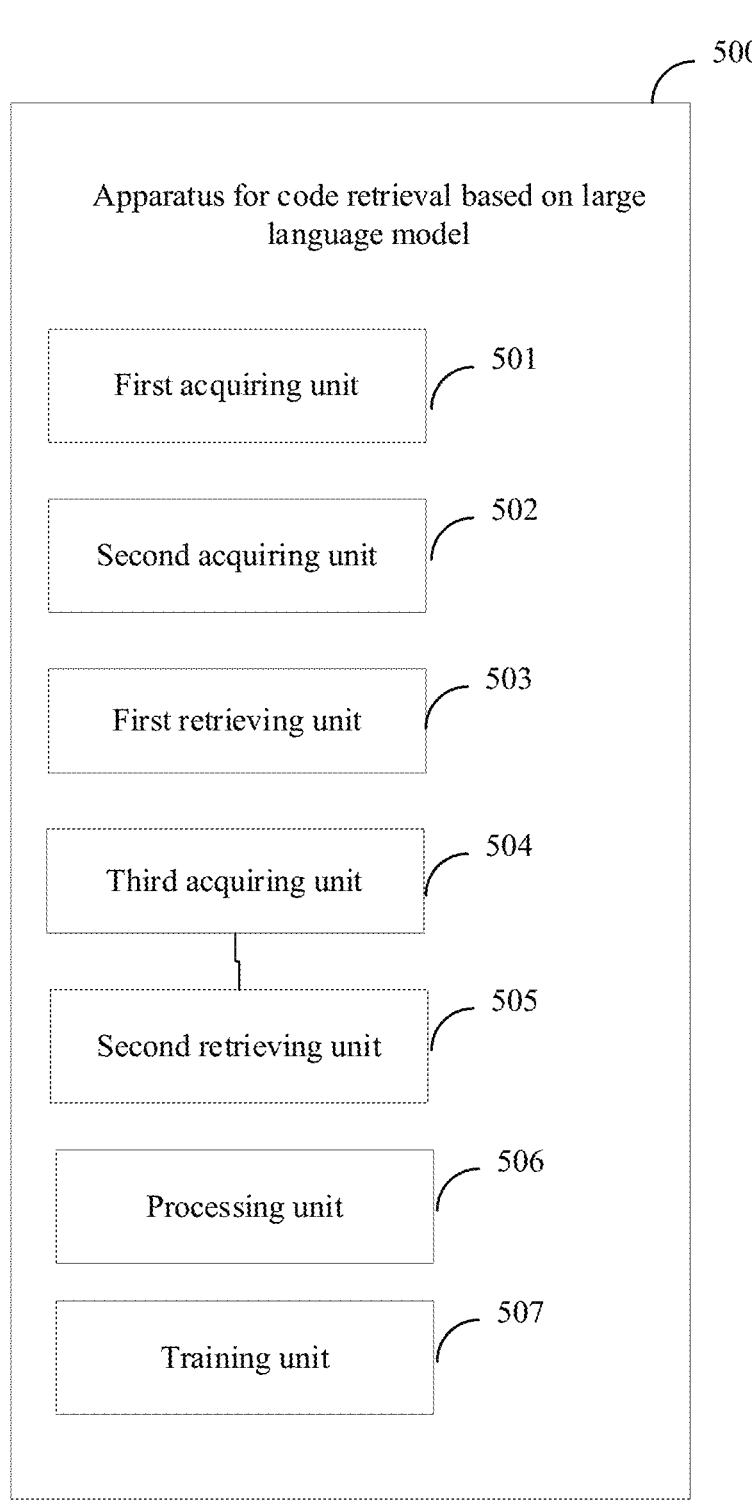
FIG. 5 is a schematic diagram according to a fifth embodiment of the present disclosure.

FIG. 5 is a schematic diagram according to a fifth embodiment of the present disclosure. As shown in FIG. 5, an apparatus 500 for code retrieval based on a large language model according to the present embodiment includes:

a first acquiring unit 501 configured to acquire a code retrieval query to obtain a retrieval vector of the code retrieval query;

a second acquiring unit 502 configured to acquire a first index of a target code library, the first index including a plurality of code blocks and a plurality of code block vectors;

a first retrieving unit 503 configured to acquire a target code block according to the retrieval vector and the first index;

a third acquiring unit 504 configured to acquire a second index of the target code library, the second index being a code architecture knowledge graph, nodes in the code architecture knowledge graph representing code files, and edges in the code architecture knowledge graph representing dependency relationships between the code files;

a second retrieving unit 505 configured to acquire a target code file corresponding to the target code block according to a source code file corresponding to the target code block and the second index; and a processing unit 506 configured to acquire a retrieval result according to the target code block and the target code file.

The code retrieval query obtained by the acquiring unit 501 is a query for retrieving a corresponding code from the target code library; the acquiring unit 501 may first acquire an initial query input at an input end, and then further acquire the code retrieval query according to the obtained initial query.

When obtaining the retrieval vector of the code retrieval query, the acquiring unit 501 may perform embedding on the code retrieval query using an existing embedding model or embedding method, and use an obtained embedded vector as the retrieval vector corresponding to the code retrieval query.

In addition, the acquiring unit 501 may further rewrite the code retrieval query first to generate a plurality of rewritten queries corresponding to the code retrieval query, and then obtain the retrieval vector for each rewritten query.

That is, the acquiring unit 501 may further obtain the plurality of rewritten queries similar to the code retrieval query by rewriting the code retrieval query, thereby improving accuracy of retrieval of the target code block in the first index.

In the present embodiment, after the acquiring unit 501 obtains the retrieval vector of the code retrieval query, the second acquiring unit 502 acquires the first index of the target code library; the first index of the present embodiment includes the plurality of code blocks and the plurality of code block vectors, and different code blocks correspond to different code block vectors.

In the present embodiment, the target code library may be a code library specified by the input end, or a code library corresponding to a current code environment in the input end.

When acquiring the first index, the second acquiring unit 502 may acquire the first index obtained in advance according to the target code library, or the first index obtained in real time according to the target code library.

When the second acquiring unit 502 acquires the first index of the target code library, the following implementation may be adopted: acquiring all code files in the target code library; after a syntax tree of each code file is parsed, cutting each code file into a plurality of code blocks according to a syntax rule; performing embedding on the obtained multiple code blocks to obtain the different code block vectors corresponding to the different code blocks; and obtaining the first index according to the plurality of code blocks and the plurality of code block vectors.

In the present embodiment, after the second acquiring unit 502 obtains the first index, the first retrieving unit 503 acquires the target code block according to the retrieval vector and the first index; in the present embodiment, the number of the target code blocks may be one or more.

When the first retrieving unit 503 acquires the target code block according to the retrieval vector and the first index, the following implementation may be adopted: performing similarity calculation on the retrieval vector and the plurality of code block vectors in the first index; and obtaining at least one target code block according to a similarity calculation result; for example, the code blocks corresponding to the code block vectors with top N similarity calculation results can be used as the at least one target code block, N being a positive integer greater than or equal to 1.

In the present embodiment, after the first retrieving unit 503 obtains the target code block, the third acquiring unit 504 acquires the second index of the target code library; the second index is the code architecture knowledge graph including the plurality of nodes and the edges between the nodes.

In the present embodiment, the nodes in the code architecture knowledge graph represent the code files in the target code library, and the edges between the nodes represent the dependency relationships between the code files in the target code library.

It can be understood that the nodes in the code architecture knowledge graph of the embodiment may represent the code files using file names or directory information of the code files.

When acquiring the second index, the third acquiring unit 504 may acquire the second index obtained in advance according to the target code library, or the second index obtained in real time according to the target code library.

The third acquiring unit 504 may manually obtain the second index according to directories to which the different code files in the target code library belong and a relationship between the directories, that is, manually determine the nodes and the edges between the nodes in the code architecture knowledge graph.

In addition, when acquiring the second index of the target code library, the third acquiring unit 504 may: acquire all code files in the target code library; generate a directory tree according to all the code files and directory information of each code file in the target code library; and input the directory tree into a code architecture extraction model to obtain the output second index.

The code architecture extraction model used by the third acquiring unit 504 is obtained by pre-training; the code architecture extraction model can output the code architecture knowledge graph corresponding to the target code library according to the input directory tree corresponding to the target code library, and then, the output code architecture knowledge graph is used as the second index.

The apparatus 500 for code retrieval based on a large language model according to the present embodiment may further include a training unit 507 configured to obtain the code architecture extraction model by performing training in advance in the following manner: acquiring training data, the acquired training data including a sample directory tree and a label code architecture knowledge graph; inputting the sample directory tree into an initial neural network model to obtain an output prediction code architecture knowledge graph; calculating a loss function value according to the obtained prediction code architecture knowledge graph and the label code architecture knowledge graph; and adjusting parameters of the initial neural network model according to the loss function value to obtain the code architecture extraction model.

In the present embodiment, after the third acquiring unit 504 obtains the second index, the second retrieving unit 505 acquires the target code file corresponding to the target code block according to the source code file corresponding to the target code block and the second index; the number of the target code files corresponding to one target code block may be one or more.

It can be understood that, if a plurality of target code blocks are acquired, the second retrieving unit 505 may acquire the target code file corresponding to each target code block.

In the present embodiment, the source code file corresponding to the target code block is a code file to which the target code block belongs in the target code library; that is, the source code file is segmented to obtain the target code block.

When the second retrieving unit 505 acquires the target code file corresponding to the target code block according to the source code file corresponding to the target code block and the second index, the following implementation may be adopted:

determining a source node corresponding to the source code file in the second index according to the source code file corresponding to the target code block; selecting a target node having an edge with the source node from the second index; and acquiring the target code file corresponding to the target node from the target code library.

That is, according to the nodes and the edges between the nodes included in the second index, the second retrieving unit 505 acquires the at least one target code file corresponding to the target code block from the target code library based on the source code file corresponding to the target code block; the present embodiment may realize acquisition of the target code file and improve accuracy of the acquired target code file.

In the present embodiment, after the second retrieving unit 505 obtains the target code file corresponding to the target code block, the processing unit 506 acquires the retrieval result according to the target code block and the target code file, and the retrieval result corresponds to the code retrieval query.

That is, the code retrieval result obtained in the present embodiment includes two parts: the target code block and the target code file corresponding to the target code block, and compared with the prior art that only the target code block is used as the retrieval result, the present embodiment can improve the richness of the obtained retrieval result, and then enhance accuracy when the retrieval result is subsequently used for code asking and answering or code continuous writing.

After the retrieval result is obtained, if the initial query is a query corresponding to code continuous writing, in the present embodiment, the processing unit 506 may further construct a prompt according to the target code block and the target code file corresponding to the target code block, and then obtain a code generation result output by the large language model according to the constructed prompt by calling the large language model.

In order to improve accuracy of the constructed prompt, the processing unit 506 may further construct the prompt according to the target code block, the target code file corresponding to the target code block, and the initial query.

In the technical solution of the present disclosure, the acquisition, storage and application of involved user personal information are in compliance with relevant laws and regulations, and do not violate public order and good customs.

According to the embodiment of the present disclosure, there are also provided an electronic device, a readable storage medium and a computer program product.

Figure 6:
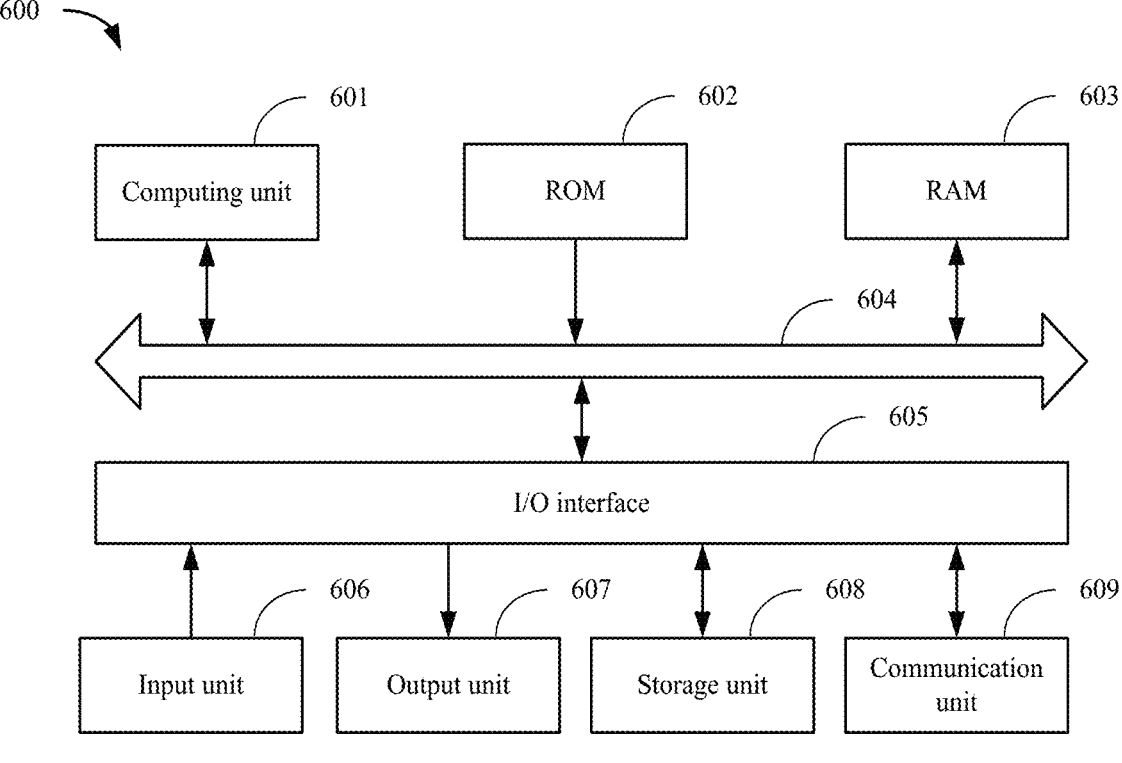
FIG. 6 is a block diagram of an electronic device configured to implement a method for code retrieval based on a large language model according to the embodiment of the present disclosure.

FIG. 6 is a block diagram of an electronic device for a method for code retrieval based on a large language model according to the embodiment of the present disclosure. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 6, the device 500 includes a computing unit 601 which may perform various appropriate actions and processing operations according to a computer program stored in a read only memory (ROM) 602 or a computer program loaded from a storage unit 608 into a random access memory (RAM) 603. Various programs and data necessary for the operation of the device 600 may be also stored in the RAM 603. The computing unit 601, the ROM 602, and the RAM 603 are connected with one other through a bus 604. An input/output (I/O) interface 605 is also connected to the bus 604.

The plural components in the device 600 are connected to the I/O interface 605, and include: an input unit 606, such as a keyboard, a mouse, or the like; an output unit 607, such as various types of displays, speakers, or the like; the storage unit 608, such as a magnetic disk, an optical disk, or the like; and a communication unit 609, such as a network card, a modem, a wireless communication transceiver, or the like. The communication unit 609 allows the device 600 to exchange information/data with other devices through a computer network, such as the Internet, and/or various telecommunication networks.

The computing unit 601 may be a variety of general and/or special purpose processing components with processing and computing capabilities. Some examples of the computing unit 601 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 601 performs the methods and processing operations described above, such as the method for code retrieval based on a large language model. For example, in some embodiments, the method for code retrieval based on a large language model may be implemented as a computer software program tangibly included in a machine readable medium, such as the storage unit 608.

In some embodiments, part or all of the computer program may be loaded and/or installed into the device 600 via the ROM 602 and/or the communication unit 609. When the computer program is loaded into the RAM 603 and executed by the computing unit 601, one or more steps of the method for code retrieval based on a large language model described above may be performed. Alternatively, in other embodiments, the computing unit 601 may be configured to perform the method for code retrieval based on a large language model by any other suitable means (for example, by means of firmware).

Various implementations of the systems and technologies described herein may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided for a processor or a controller of a general purpose computer, a special purpose computer, or training apparatuses of other programmable vehicle positioning or positioning models, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may include or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a block-chain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A computer-implemented method for code retrieval based on a large language model, comprising:
   acquiring an initial query corresponding to code continuous writing at an input end;
   acquiring a code retrieval query according to the initial query to obtain a retrieval vector of the code retrieval query, the code retrieval query being a query for retrieving a corresponding code from a target code library;
   acquiring a first index of the target code library, the first index comprising a plurality of code blocks and a plurality of code block vectors;
   performing similarity calculation on the retrieval vector and the plurality of code block vectors in the first index; and obtaining at least one target code block corresponding to the code block vectors with top N similarity calculation results, N being a positive integer greater than or equal to 1;
   acquiring a second index of the target code library, the second index being a code architecture knowledge graph, nodes in the code architecture knowledge graph representing code files, and edges in the code architecture knowledge graph representing dependency relationships between the code files;
   acquiring a target code file corresponding to the target code block according to a source code file corresponding to the target code block and the second index;

acquiring a retrieval result corresponding to the code retrieval query which comprises the target code block and the target code file corresponding to the target code block,
constructing a prompt according to the target code block and the target code file;
obtaining an output code generation result according to the prompt by calling the large language model; and
returning the output code generation result output by the large language model to the input end to continue with the code continuous writing.

2. The method according to claim 1, wherein the acquiring a second index of the target code library comprises:
   acquiring all code files in the target code library;
   generating a directory tree according to all the code files and directory information of each code file in the target code library; and
   inputting the directory tree into a code architecture extraction model to obtain the output second index,
   the code architecture extraction model is obtained by pre-training.

3. The method according to claim 2, further comprising:
   acquiring training data, the training data comprising a sample directory tree and a label code architecture knowledge graph;
   inputting the sample directory tree into an initial neural network model to obtain an output prediction code architecture knowledge graph;
   calculating a loss function value according to the prediction code architecture knowledge graph and the label code architecture knowledge graph; and
   adjusting parameters of the initial neural network model according to the loss function value to obtain the code architecture extraction model.

4. The method according to claim 1, wherein the acquiring a target code file corresponding to the target code block according to a source code file corresponding to the target code block and the second index comprises:
   determining a source node corresponding to the source code file in the second index according to the source code file corresponding to the target code block;
   selecting a target node having an edge with the source node from the second index; and
   acquiring the target code file corresponding to the target node from the target code library.

5. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a method for code retrieval based on a large language model, wherein the method for code retrieval based on a large language model comprises:
   acquiring an initial query corresponding to code continuous writing at an input end;
   acquiring a code retrieval query according to the initial query to obtain a retrieval vector of the code retrieval query, the code retrieval query being a query for retrieving a corresponding code from a target code library;
   acquiring a first index of the target code library, the first index comprising a plurality of code blocks and a plurality of code block vectors;

performing similarity calculation on the retrieval vector and the plurality of code block vectors in the first index; and obtaining at least one target code block corresponding to the code block vectors with top N similarity calculation results, N being a positive integer greater than or equal to 1;

acquiring a second index of the target code library, the second index being a code architecture knowledge graph, nodes in the code architecture knowledge graph representing code files, and edges in the code architecture knowledge graph representing dependency relationships between the code files;

acquiring a target code file corresponding to the target code block according to a source code file corresponding to the target code block and the second index;

acquiring a retrieval result corresponding to the code retrieval query which comprises the target code block and the target code file corresponding to the target code block, constructing a prompt according to the target code block and the target code file;

obtaining an output code generation result according to the prompt by calling the large language model; and returning the output code generation result output by the large language model to the input end to continue with the code continuous writing.

6. The electronic device according to claim 5, wherein the acquiring a second index of the target code library comprises:

acquiring all code files in the target code library;

generating a directory tree according to all the code files and directory information of each code file in the target code library; and inputting the directory tree into a code architecture extraction model to obtain the output second index, the code architecture extraction model is obtained by pre-training.

7. The electronic device according to claim 6, further comprising a training unit configured to:

acquiring training data, the training data comprising a sample directory tree and a label code architecture knowledge graph;

inputting the sample directory tree into an initial neural network model to obtain an output prediction code architecture knowledge graph;

calculating a loss function value according to the prediction code architecture knowledge graph and the label code architecture knowledge graph; and adjusting parameters of the initial neural network model according to the loss function value to obtain the code architecture extraction model.

8. The electronic device according to claim 5, wherein the acquiring a target code file corresponding to the target code block according to a source code file corresponding to the target code block and the second index comprises:

determining a source node corresponding to the source code file in the second index according to the source code file corresponding to the target code block;

selecting a target node having an edge with the source node from the second index; and acquiring the target code file corresponding to the target node from the target code library.

9. A non-transitory computer readable storage medium with computer instructions stored thereon, wherein the computer instructions are used for causing a method for code retrieval based on a large language model, wherein the method for code retrieval based on a large language model comprises:

acquiring an initial query corresponding to code continuous writing at an input end;

acquiring a code retrieval query according to the initial query to obtain a retrieval vector of the code retrieval query, the code retrieval query being a query for retrieving a corresponding code from a target code library;

acquiring a first index of the target code library, the first index comprising a plurality of code blocks and a plurality of code block vectors;

performing similarity calculation on the retrieval vector and the plurality of code block vectors in the first index; and obtaining at least one target code block corresponding to the code block vectors with top N similarity calculation results, N being a positive integer greater than or equal to 1;

acquiring a second index of the target code library, the second index being a code architecture knowledge graph, nodes in the code architecture knowledge graph representing code files, and edges in the code architecture knowledge graph representing dependency relationships between the code files;

acquiring a target code file corresponding to the target code block according to a source code file corresponding to the target code block and the second index;

acquiring a retrieval result corresponding to the code retrieval query which comprises the target code block and the target code file corresponding to the target code block, constructing a prompt according to the target code block and the target code file;

obtaining an output code generation result according to the prompt by calling the large language model; and returning the output code generation result output by the large language model to the input end to continue with the code continuous writing.

10. The non-transitory computer readable storage medium according to claim 9, wherein the acquiring a second index of the target code library comprises:

acquiring all code files in the target code library;

generating a directory tree according to all the code files and directory information of each code file in the target code library; and inputting the directory tree into a code architecture extraction model to obtain the output second index, the code architecture extraction model is obtained by pre-training.

11. The non-transitory computer readable storage medium according to claim 10, further comprising:

acquiring training data, the training data comprising a sample directory tree and a label code architecture knowledge graph;

inputting the sample directory tree into an initial neural network model to obtain an output prediction code architecture knowledge graph;

calculating a loss function value according to the prediction code architecture knowledge graph and the label code architecture knowledge graph; and adjusting parameters of the initial neural network model according to the loss function value to obtain the code architecture extraction model.

12. The non-transitory computer readable storage medium according to claim 9, wherein the acquiring a target code file corresponding to the target code block according to a source code file corresponding to the target code block and the second index comprises:

determining a source node corresponding to the source code file in the second index according to the source code file corresponding to the target code block;

selecting a target node having an edge with the source node from the second index; and acquiring the target code file corresponding to the target node from the target code library.

* * * * *